United States Patent
Ben-Levi

(10) Patent No.: US 8,363,229 B2
(45) Date of Patent: Jan. 29, 2013

(54) SYSTEM AND METHOD FOR HEIGHT TRIANGULATION MEASUREMENT

(75) Inventor: Meir Ben-Levi, Haifa (IL)

(73) Assignee: Camtek Ltd., Migdal Ha'emek, IL (US)

( * ) Notice: Subject to any disclaimer, the term of this patent is extended or adjusted under 35 U.S.C. 154(b) by 1183 days.

(21) Appl. No.: 11/568,542

(22) PCT Filed: May 1, 2005

(86) PCT No.: PCT/IL2005/000455
§ 371 (c)(1),
(2), (4) Date: Mar. 1, 2010

(87) PCT Pub. No.: WO2005/104658
PCT Pub. Date: Nov. 10, 2005

(65) Prior Publication Data
US 2010/0220340 A1    Sep. 2, 2010

(30) Foreign Application Priority Data

May 3, 2004  (IL) .......................................... 161745

(51) Int. Cl.
*G01B 11/24*    (2006.01)
(52) U.S. Cl. ..................................................... 356/602
(58) Field of Classification Search ........................ None
See application file for complete search history.

(56) References Cited

U.S. PATENT DOCUMENTS

| | | | |
|---|---|---|---|
| 3,187,185 A | 6/1965 | Milnes | |
| 5,028,799 A | 7/1991 | Chen et al. | |
| 5,818,061 A | 10/1998 | Stern et al. | |
| 6,181,424 B1 | 1/2001 | Okabayashi et al. | |
| 6,340,109 B2 | 1/2002 | Hashimoto et al. | |
| 6,975,410 B1 * | 12/2005 | Sturgill | 356/631 |
| 7,145,654 B2 * | 12/2006 | Norton | 356/369 |

OTHER PUBLICATIONS

Camtek Ltd., International Search Report (As Published), 1 pg, Feb. 10, 2006.

* cited by examiner

*Primary Examiner* — Gregory J Toatley
*Assistant Examiner* — Amanda Merlino
(74) *Attorney, Agent, or Firm* — Reches Patents

(57) ABSTRACT

A method for height triangulation measurement particularly for measuring the height of an object on a surface, the method includes: a) illuminating said object from a known angle with a narrow strip of light, having a large numerical aperture along said light strip and a small numerical aperture perpendicular to said light strip; b) imaging said object from a known angle having a large numerical aperture along said light strip and a small numerical aperture perpendicular to said light strip, having an image of said object illuminated by said light strip; and c) calculating the height of said object from the location of said light strip on said image.

7 Claims, 3 Drawing Sheets

SYSTEM AND METHOD FOR HEIGHT TRIANGULATION MEASUREMENT

CROSS REFERENCES TO RELATED APPLICATIONS

The present patent application is a national phase application of International Application No. PCT/IL2005/000455 filed May 1, 2005, which claims priority benefit from Israel Provisional Application 161745 filed May 3, 2004.

FIELD OF THE INVENTION

The present invention relates to optical triangulation systems, with the purpose to measure height of small objects such as wafer bumps. This measurement is essential for process control in semiconductors fabrication.

BACKGROUND OF THE INVENTION

Solder bumps have become a standard way to connect semiconductor devices to substrates and substrates to the Printed Circuit Board (PCB). It is therefore, that the technology is important for two different industries, Wafers fabrication and PCB manufacturing. Although there is a lot of similarity between PCB and wafer bumps, there are also differences in height and diameter of the bumps, which affect the process control. In general, wafer bumps are substantially smaller than PCB bumps. Typical numbers are 100 μm bump height in wafers and 300 μm in PCB, but there can be large variations from these numbers.

To have a good connection, all bumps (there may be thousands of bumps on each die) must be uniform in their height within an allowable tolerance. Therefore, bumps height metrology is an essential part of the process control in both fabrications.

The common way to measure bumps in the PCB industry, is to scan over the area of an object (PCB or Substrate) with laser line triangulation. Triangulation has a long history as a 3D measurement tool, and it comes with a large variety of optical configurations. U.S. Pat. No. 3,187,185 (to Milnes and Pitcairn, June 1965) describes an optical triangulation system in which a narrow strip of light is projected upon a flat object from a well-defined angle α. A camera, images the object from another defined angle β. The height of the object can then be measured from the position of the strip upon the image, provided that angles α and β are known and the object is considered to be flat. In a second embodiment, Milnes and Pitcairn also present a configuration of two line projectors and one camera. This concept is the basic configuration for most bumps metrology systems today. As a light source it is common to use a laser, because it provides high intensity at a very narrow strip and the spatial coherence of the laser guarantees good definition of the illumination angle. U.S. Pat. No. 5,028,799 to Chen et al. describes a laser triangulation system for bumps metrology, employing two lasers and one camera. Two lasers can overcome several issues including different optical behavior of the solder and the substrate.

While laser triangulation provides satisfactory measurement of PCB solder bumps, it makes an excessive error measuring small Wafer bumps. This error is known as "shape-error", and it is typical to small bumps or other features having smaller size than the illumination (the width of the strip). Although solder bumps are usually larger than 100 μm in diameter, since they have a ball shape, only a small section at the top of the ball can be observed. The nature of shape-error is that a feature will be measured properly only when located at the centerline of the strip. When the feature is moved forward or backward, the triangulation height measurement will have an up or down error respectively. While scanning, both errors will occur (up and down errors) therefore theoretically, they can be summed up to zero. This implies that an averaging along the scanning axis is highly recommended to improve shape-errors. Averaging alone however, can give satisfactory results in terms of accuracy (1-3 μm typically), only if the bumps have a smooth, well reflecting surface. In reality, the processes of manufacturing solder bumps create surface defects, especially if they are manufactured in a led-free process. These surface defects do not reflect light completely or partially, therefore they make it impossible to get enough data to eliminate the shape-errors by averaging. Large defect located at the bump-top can even prevent the measurement completely.

The present invention overcomes these disadvantages by using a spatially incoherent illumination in a unique optical configuration.

Another known optical-errors is expressed by the fact that usually different heights results are achieved from different direction of scanning. Therefore, a common way of measuring is to scan the object twice, from right to left and then from left to right and averaging the results. The "symmetrical configuration" of the present invention enables the averaging in a single scan.

SUMMARY OF THE INVENTION

The present invention is a method and a system for height triangulation measurement particularly for measuring the height of an object on a surface.

According to the teachings of the present invention there is provided a method for height triangulation measurement particularly for measuring the height of an object on a surface, this method comprising:

a) illuminating the object from a known angle with a narrow strip of light being spatially incoherent, having a large numerical aperture along the light strip and a small numerical aperture perpendicular to the light strip;

b) imaging the object with a large numerical aperture along the light strip and a small numerical aperture perpendicular to the light strip; and c) calculating the height of the object from the location of the light strip on the image.

According to further features in the described preferred embodiments, the method of the present invention is provided, further includes the usage of a first aperture-stop located in the direction of the illumination and second aperture-stop located in the direction of the imaging, wherein the aperture-stops have a rectangle shape wherein the longer axis is parallel to the light strip and the narrow axis is perpendicular to the light strip, the aperture-stops are located in order to define the numerical apertures of the illumination channel and the imaging channel.

According to further features in the described preferred embodiments, the method of the present invention is provided with a usage of a symmetrical configuration, wherein from both sides illuminating and imaging, using two beam-splitters each one enables to reflect the illumination from a perpendicular location and to pass the reflected image direct for imaging.

By another aspect of the preset invention it is provided a system for height triangulation measurement particularly for measuring the height of an object on a surface, the system comprising of:

an illuminating means capable to illuminate with a narrow strip of light being spatially incoherent;

an imaging means capable to image the object from a known angle, having an image of the light strip on the object; and calculating means to calculate the height of the object from the location of the light strip on the image.

In a preferred embodiment, the system of the present invention is provided, further includes a first aperture-stop located in the direction of the illumination and second aperture-stop located in the direction of the imaging, wherein both aperture-stops have a rectangle shape with a longer axis along the light strip and a narrow axis perpendicular to the light strip, the aperture-stops are located in order to define the numerical apertures of the illumination channel and the imaging channel.

By another aspect of the present invention it is provided a symmetrical configuration system for height triangulation measurement particularly for measuring the height of an object on a surface. This system comprising:

first and second illuminating and imaging sets, wherein the first set is illuminating and imaging the object from an opposite angle of the second set and wherein each set includes:

an illuminating means capable to illuminate with a narrow strip of light being spatially incoherent, having a large numerical aperture along the light strip and a small numerical aperture perpendicular to the light strip;

a beam splitter to reflect the illumination to the object and enables a direct pass of the reflected image from the object or vice versa;

an imaging means capable to image the object, having an image of the light strip on the object; and an aperture-stop located in the direction of the illuminating and imaging;

calculating means to calculate both heights of the object from the location of the light strip on the image as measured by the first and second set and average the results.

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DESCRIPTION OF THE PREFERRED EMBODIMENTS

The main object of the present invention is to provide a triangulation method and apparatus for metrology of small features such as wafer bumps and to reduce the sensitivity to surface defects. The invented apparatus maintains a long depth of focus and good definitions of the illumination and imaging angles.

The invention overcomes the limitations of the prior art by illuminating the object with a narrow strip of light, which is spatially incoherent and having a large numerical aperture. This illumination enables information from a larger section over a ball-shape bump and it reduces the noise related to surface roughness. To maintain a long depth of focus and to define the exact angles of illumination versus imaging, the invention introduces a non-circular aperture, which limits the numerical aperture in one axis.

Hence, there is provided according to the teaching of the present invention a method of improving the triangulation metrology over wafer bumps and other features comprising the steps of illuminating the object from a well defined angle with a narrow strip of light being spatially incoherent and having a large numerical aperture along the strip and a small numerical aperture perpendicular to the strip; imaging the object from a different well defined angle with imaging system having a large numerical aperture along the strip of light and small numerical aperture perpendicular to the strip; and analyzing the height of the object from the location of the imaged strip on the imaged object.

Figure 1:
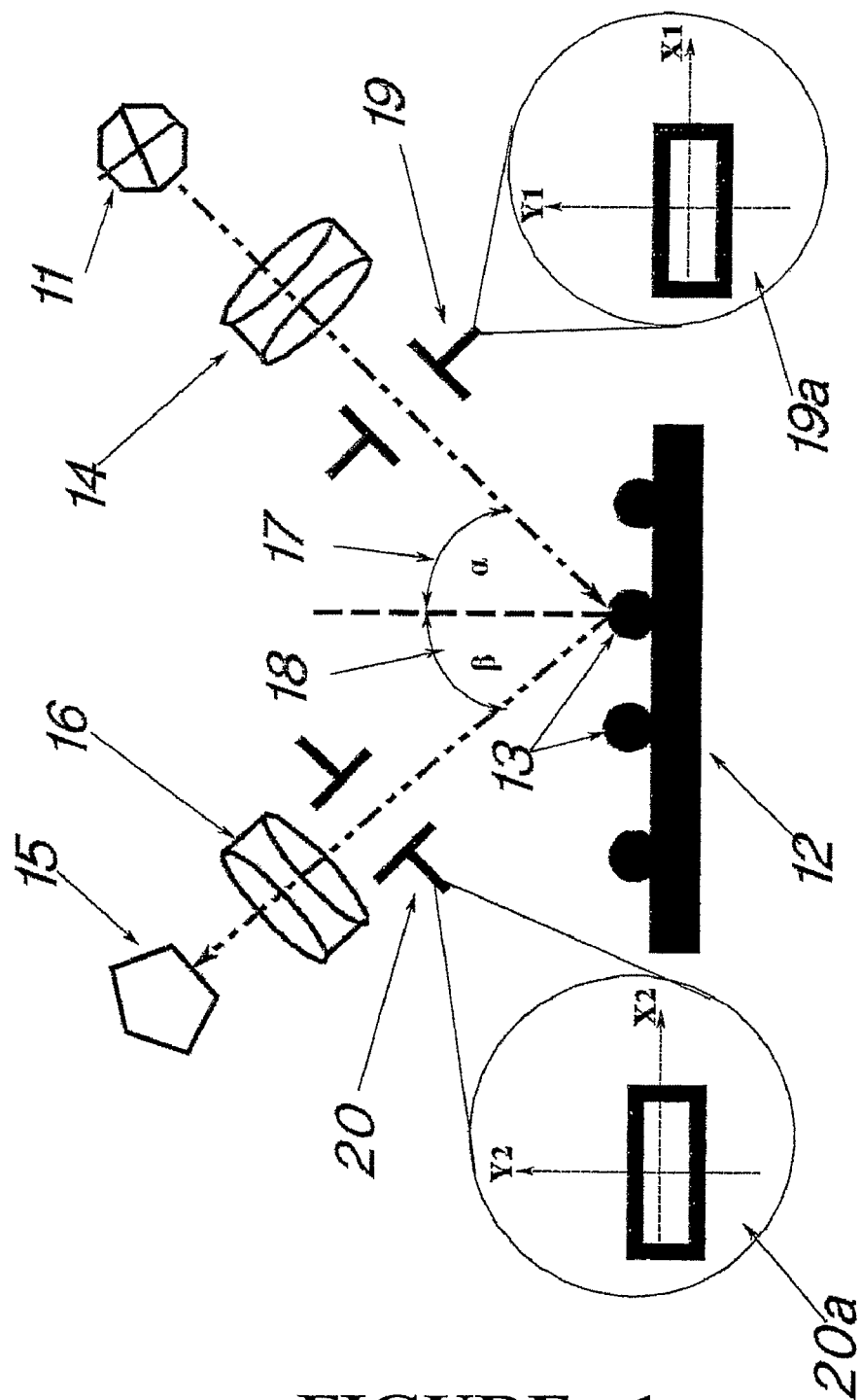
FIG. 1 shows the optical setup of the Triangulation metrology system.

Referring now to the drawings, FIG. 1 shows the optical setup of a triangulation system to measure small ball-shape bumps. A source strip of light (11) is projected upon the object (12) through an imaging system (14). A camera (15) receives the rays of light through an optical imaging system (16) and the height of the object is calculated from the image using the angles α (17) and β (18). Aperture stops (19) and (20) define the numerical apertures of the projecting and imaging channels. The apertures (19a) and (20a) are designed to allow large numerical aperture along the strip (axes x1 and x2) and to limit the numerical aperture in the axis perpendicular to the strip (axes y1 and y2).

Figure 2:
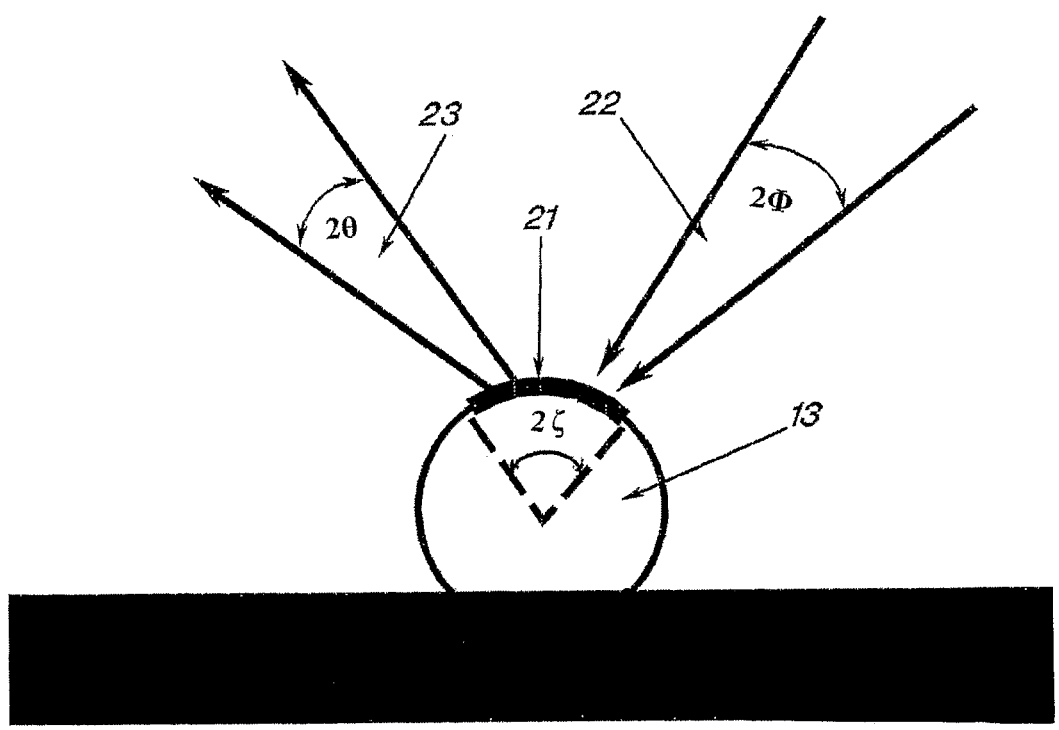
FIG. 2 shows ray tracing of light reflected from ball shape bump.

To understand the roll of the apertures (19) and (20) consider FIG. 2 showing the imaging of a single bump (13). As the bump (13) is illuminated with angle 2φ (22) and imaged by angle 2θ (23), only a small section 2ζ (21) upon the bump (13) can direct light from projection to imaging. The angular size of the section ζ (21) can be calculated through:

$$2\zeta = \phi + \theta \quad (1)$$

Where $\sin(\phi)$ and $\sin(\theta)$ are the numerical apertures at the projection and imaging channels.

As the height of the bump (13) can be measured only upon the section 2ζ (21), it is desired to extend ζ (21) as large as possible, so surface defects will not prevent the measurement. That implies large numerical apertures on both channels are required. On the other hand, there are contradicting demands for high definition of the illumination and imaging angles, which require small numerical apertures. The range of measurement by the triangulation system also requires small numerical apertures for long depth of focus.

The depth of focus on the projection channel ($DOF_1$) can be calculated by:

$$DOF_1 = \delta/\sin(\phi) \quad (2)$$

Where δ is the width of the illuminated strip.

In the same manner, the depth of focus on the imaging channel is:

$$DOF_2 = \delta/\sin(\theta) \quad (3)$$

Like said, long depth of focus and large measurement range requires small numerical apertures.

Aperture stops (19) and (20) settle the contradicting requirements. Front views (19a) and (20a) of the apertures in FIG. 1, show that they have a rectangular shape, so the numerical aperture along axes $y_1$, $y_2$ (perpendicular to strip) is limited. This configuration allows long depth of focus in the sense that the strip remains narrow at a long range of measurement. At the same time, the large numerical aperture along the strip allows measurement at a large section on the bump (13) to overcome shape error and issues of surface defects.

Figure 3:
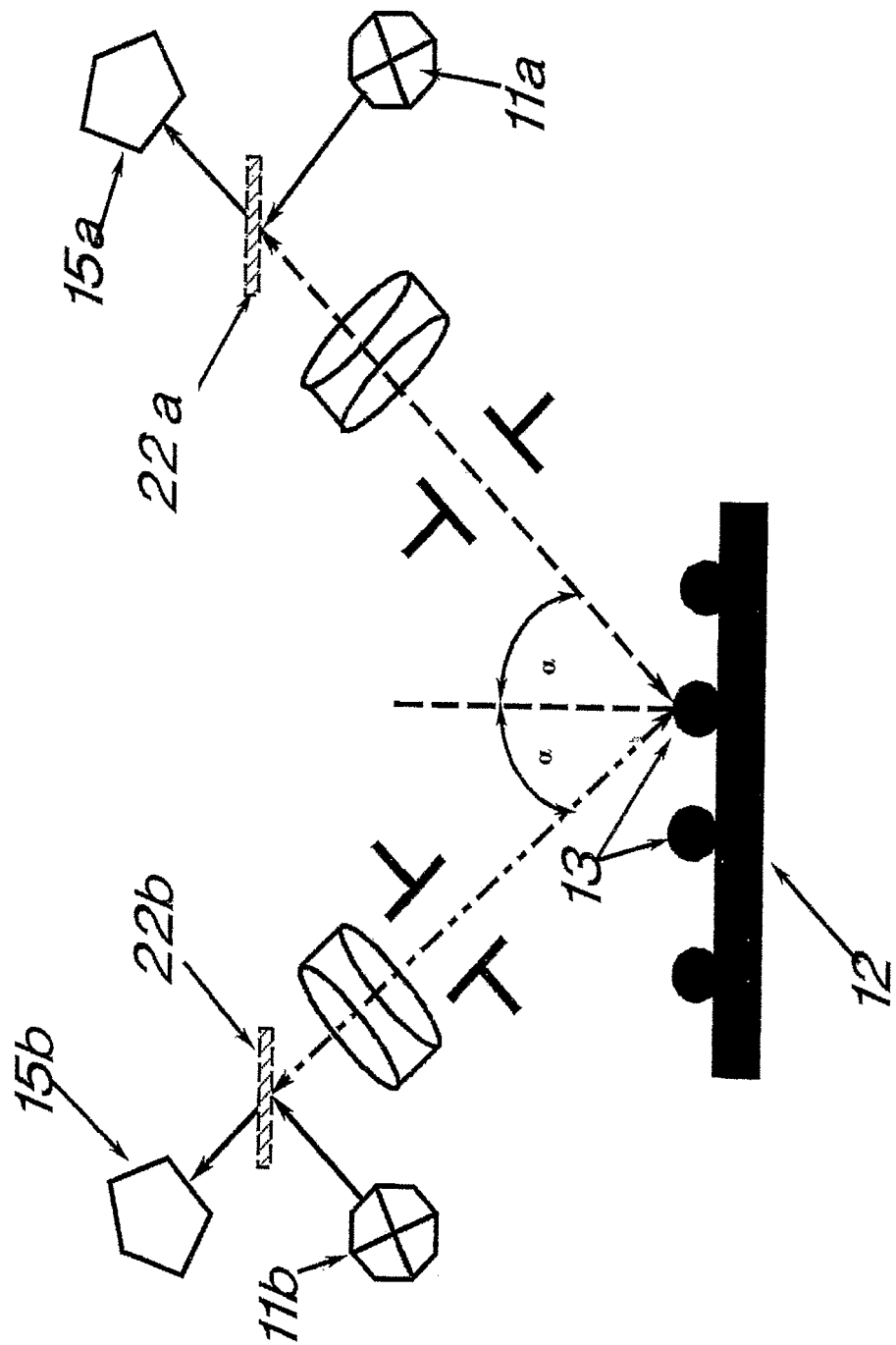
FIG. 3 shows the optical setup of the triangulation metrology system in symmetrical configuration.

FIG. 3 shows the optical setup of the triangulation metrology system in symmetrical configuration that includes two sets of illuminating and imaging, one from the opposite angle of the other. In this configuration there are two light sources (11a and 11b) illuminating the bumps (13) on the object (12) from a perpendicular direction, reflected by beam-splitters (22a & 22b). The beam-splitters (22a & 22b) enable the reflected image from the bumps (13) to pass to the imaging means (15a & 15b). The bump (13) height is calculated by both sets and usually having different results that can be averaged.

Although the invention has been described in conjunction with specific embodiments thereof, it is evident that many alternatives, modifications and variations will be apparent to those skilled in the art, accordingly, it is intended to embrace all such alternatives, modifications and variations that fall within the spirit and broad scope of the appended claims.

What is claimed is:

1. A method for height triangulation measurement particularly for measuring the height of an object on a surface comprising:
    a) illuminating by an illumination channel said object from a known angle with a narrow light strip, said illumination channel having a large numerical aperture along a longitudinal axis of said narrow light strip and a small numerical aperture perpendicular to said longitudinal axis of said narrow light strip;
    b) imaging said object from a known angle by an imaging channel having a large numerical aperture along said narrow light strip and a small numerical aperture perpendicular to said narrow light strip; and
    c) calculating the height of said object from the location of said narrow light strip on said image.

2. The method for height triangulation measurement of claim 1, wherein said narrow light strip is spatially incoherent.

3. The method for height triangulation measurement of claim 1, further includes the usage of a first aperture stop located in the direction of said illumination and second aperture stop located in the direction of said imaging, wherein said aperture stops have a rectangle like shape passage with a longer axis located parallel to said narrow light strip, said aperture stops are located in order to define the numerical apertures of said illumination channel and of said imaging channel in at least in one axis.

4. The method for height triangulation measurement of claim 2, further includes the usage of a symmetrical configuration, wherein from both sides illuminating and imaging, using two beam-splitters each one enables to reflect said illumination from a different location and to pass said reflected image direct for imaging.

5. A system for height triangulation measurement particularly for measuring the height of an object on a surface, said system comprising:
    an illuminating means for illuminating said object from a known angle with a narrow light strip being spatially incoherent, the illuminating means having a large numerical aperture along a longitudinal axis of the narrow light strip and a small numerical aperture perpendicular to the longitudinal axis of the narrow light strip;
    an imaging means for imaging said object from a known angle, the imaging means having a large numerical aperture along said narrow light strip and a small numerical aperture perpendicular to said narrow light strip; and
    calculating means for calculating the height of said object from the location of said light strip on said image.

6. The system for height triangulation measurement of claim 5, further includes a first aperture stop located in the direction of said illumination and second aperture stop located in the direction of said imaging, wherein both said aperture stops have a rectangle like shape passage, said passage is located parallel to said light strip with a longer axis located parallel to said narrow light strip, said aperture stops are located in order to define the numerical apertures of said illumination means and said imaging means.

7. A symmetrical configuration system for height triangulation measurement particularly for measuring the height of an object on a surface, said system comprising:
    first and second illuminating and imaging sets, wherein said first set is illuminating and imaging said object from an opposite angle of said second set and wherein each of said sets includes:
    an illuminating means for illuminating with a narrow light strip being spatially incoherent, the illuminating means having a large numerical aperture along a longitudinal axis of the narrow light strip and a small numerical aperture perpendicular to the longitudinal axis of the light strip;
    a beam splitter to reflect said illumination to said object and enables a direct pass of the reflected image from said object or vice versa;
    an imaging means for imaging said object, having a large numerical aperture along said narrow light strip and a small numerical aperture perpendicular to said narrow light strip; and
    an aperture-stop located in the direction of said illuminating and imaging; and
    calculating means for calculating both heights of said object from the location of the light strip on the image as measured by said first and second set and average the results.

* * * * *